Sept. 12, 1961 C. O. JONKERS 2,999,365
METHOD OF SEPARATING GASEOUS IMPURITIES
FROM A GASEOUS MIXTURE
Filed July 25, 1955
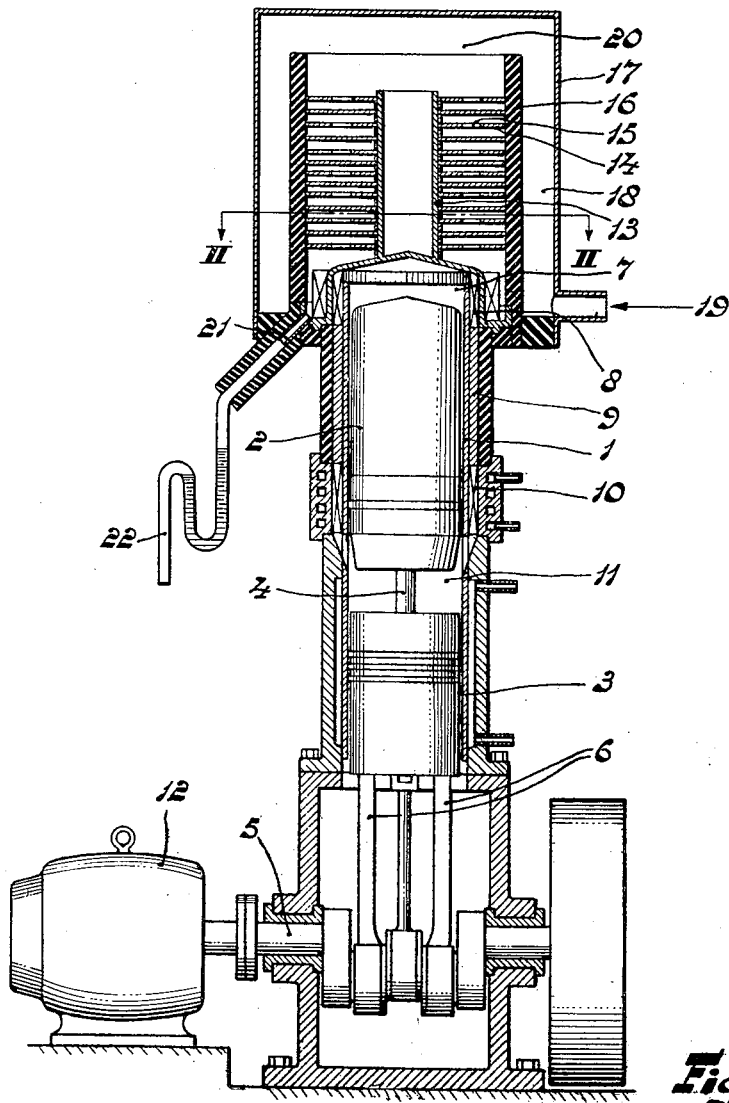
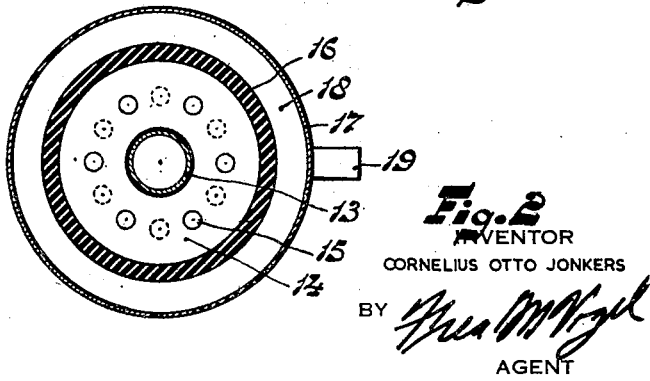
INVENTOR
CORNELIUS OTTO JONKERS
BY
AGENT

United States Patent Office 2,999,365
Patented Sept. 12, 1961

2,999,365
METHOD OF SEPARATING GASEOUS IMPURITIES FROM A GASEOUS MIXTURE
Cornelius Otto Jonkers, Eindhoven, Netherlands, assignor, by mesne assignments, to North American Philips Company, Inc., New York, N.Y., a corporation of Delaware
Filed July 25, 1955, Ser. No. 524,183
Claims priority, application Netherlands July 24, 1954
2 Claims. (Cl. 62—12)

When air or some other gaseous mixture containing impurities such as water vapor or carbon dioxide is cooled sufficiently, the impurities will frequently be separated out. These impurities may be deposited at undesirable points so that it is generally advisable to remove the impurities from the gas mixture prior to condensing or fractionating the remaining gases of the mixture.

The present invention which is a continuation-in-part of my U.S. Pat. No. 2,900,798 issued August 25, 1959, provides a method of separating such impurities from a gas mixture by using a heat exchanger in which the mixture is cooled so that one or more constituents separate out on at least one of the plate-shaped projections which extend at right angles to a support. The medium or mixture is in heat-exchanging contact with the projections and the support extends from the hot end of the heat exchanger where the medium is supplied to the cold end where the medium is discharged. The projections extend to a wall or housing and have apertures in them for allowing the mixture to be transferred through the heat exchanger. The apertures of successive projections are positioned in staggered relationship to one another. Thus, the impurities settle on the projections.

The heat exchanger must satisfy certain requirements in order that the constituents can be separated from the gas mixture to a sufficient extent.

The component parts of the heat exchanger are properly chosen and operated so that the mean temperature of each projection is at a maximum of 20° C. and preferably at a maximum of 10° C., less than that of the next subsequent projection nearer the hot end of the heat exchanger. In addition, the heat exchanger is normally operated so that the mean temperature of the projection on which the separation process begins is at a maximum of 20° C. and preferably at a maximum of 10° C. less than the separation point of the constituents as supplied to the projections.

By ensuring that the mutual temperature difference between the projections is not excessive, freezing out of the impurities before they come into contact with the projections is prevented. Otherwise the impurities might form fine ice grains in the medium which do not settle on the projections and together with the remainder of the gas mixture are discharged from the heat exchanger, so that the gas is not purified.

In addition, it has been found that not only the amount of the gas mixture which pass through an aperture but also the mean velocity of the gas influences the satisfactory operation of the heat exchanger. When the amount of the gas and its velocity through the heat exchanger are too low, the latter may operate less satisfactorily.

Therefore, in the heat exchanger in accordance with the invention at least 0.1 gram of the medium to be cooled as it is supplied to the system passes through each aperture per second. The area of each aperture is such that the mean velocity in each aperture is at least 5 cms. per second.

The mean velocity in the apertures is found by dividing the amount of medium which is supplied to the heat exchanger by the area of the apertures formed in a plate-shaped projection. In cooling, the volume of the gas mixture decreases so that the effective velocity in the apertures will exceed the calculated velocity. Also, the weight of the gas mixture passing through each aperture per second relates to the gas mixture as supplied to the heat exchanger. During cooling of the medium impurities are frozen out so that the weight of the medium is decreased, but these amounts generally will be negligible per dm.$^3$ of the medium. Preferably, the maximum velocity in an aperture is 500 cms. per second.

The heat exchanger in accordance with the invention can be used as an ice separator in a gas refrigerator and, more particularly, for freezing out water vapor from air. In this event generally all the heat which is withdrawn from the gas mixture to be cooled will be conducted away to the gas refrigerator through the support.

The invention will now be described more fully with reference to the accompanying diagrammatic drawing in which one embodiment thereof is shown by way of example, and in which—

FIG. 1 is a sectional view partly in elevation of a gas refrigerator and a heat exchanger embodying the present invention and FIG. 2 is a cross sectional view of the heat exchanger taken along the line II—II of FIG. 1.

The gas refrigerator shown in FIG. 1 is of the displacer type and has a cylinder 1 in which a displacer 2 and a piston 3 reciprocate with at least a substantially constant phase difference. The displacer is coupled to a crank of a crank shaft 5 by means of a connecting rod system 4 and the piston is coupled to cranks on the same crank-shaft by means of a crank-shaft system 6.

The displacer 2 cools the space of a chamber 7, the so-called freezing chamber, which through a freezer 8, a thermal regenerator 9 and a cooler 10 communicates with a chamber 11, the chamber of higher temperature.

The operating medium contained in chamber 7 is substantially expanded and this medium is substantially compressed in chamber 11 because of the reciprocating motion of the piston and the displacer by rotation of the crank-shaft 5, which is driven by electric motor 12.

Consequently, thermal energy can be supplied to the freezer 8 and to the freezing chamber 7, which thermal energy can be withdrawn from a medium required to be cooled.

At the upper end of the refrigerator a support 13 is provided comprising plate-shaped projections 14 having apertures 15 formed in them. The apertures are disposed in a manner such that the apertures in each projection are arranged opposite wall portions of the adjacent projections. The projections 14 are surrounded by an insulating wall 16. This wall or housing is surrounding by a second wall 17 so that an annular duct 18 exists between the two walls. The medium to be cooled by the refrigerator, for example air, is supplied through pipe 19 to annular duct 18. The medium flows upward and enters the chamber 20 from which it can pass through the apertures provided in the uppermost plate-shaped projection.

The support 13 and projections 14 are proportioned and made of a material e.g. copper such that the mean temperature difference between two subsequent plate shaped projections can be maintained at a maximum of 20° C. and the temperature of the projection on which separating out begins is at a maximum of 20° C. and preferably at a maximum of 10° C. less than the separating point of the impurity which is contained in the gas mixture and is required to be frozen out. Thus, the formation of fine snow can be impeded or even prevented.

The cooled medium is subsequently condensed by means of the freezer 8 and is drawn off through a pipe 21 including a trap 22 therein. The trap 22 is similar to that shown and described in U.S. Patent No. 2,745,262 issued May 15, 1956, to Kohler et al.

Through the apertures 15 in the projections at least 0.1 gram of the medium to be cooled passes per second, the mean velocity in each aperture being at least 5 cms. per second.

When 6 kgs. of air are supplied to the refrigerator shown per hour, i.e., 1.67 grams per second, according to the invention each projection has a maximum of 16 apertures.

Assuming the specific gravity of air to be 1.205 kg./m.³ at 20° C. and 760 mms. of mercury, 1385 cm.³ of air is supplied to the projections per second. The mean velocity of the air must be at least 5 cms. per second. Consequently, the total area of the apertures in each projection is at a maximum of 277 cm.².

When the heat exchanger comprises 6 apertures, as is shown in the figure, according to the invention the area of each aperture should be a maximum of $$\frac{277}{6} = 46.2 \text{ cm}^2$$

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A method of separating from a mixture of gases wherein a heat exchanger having said gases passing therethrough, is provided with a supporting member which is operatively connected to a thermal sink, a plurality of apertured plates mounted in spaced relationship on said supporting member and extending at right angles thereto, and a housing engaging the peripheral edges of said projections for enclosing the same, said housing having an inlet port at the hotter end of said heat exchanger where the gas mixture is admitted and an outlet port at the colder end thereof where the gas mixture is discharged, said thermal sink being adjacent to the outlet port adjacent to the colder end of the housing, said thermal sink forming a cold source for said housing, the apertures in successive plates being arranged in staggered relationship to each other, comprising the steps of introducing said gaseous mixture into the inlet port of said heat exchanger at a pressure where the rate of flow speed is such that at least 0.1 gram of the gas mixture per second calculated on the basis of a volume of the gases entering said inlet port is transferred through each aperture of said plates at a mean velocity of at least 5 cm. per second, said projections being cooled such that each successive plate is at a maximum temperature of 10° to 20° C. less than the next preceding plate in a direction toward the outlet port, and the plate at which said separation is effected being at a temperature between 10° to 20° C. below the separation point of said gas to be separated thereby substantially preventing the formation of ice grains in the medium and causing the water and carbon dioxide to settle on said projections.

2. A method of separating water vapor from an air sample wherein a heat exchanger having said air sample passing therethrough, is provided with a supporting member which is operatively connected to a thermal sink, a plurality of apertured plates mounted in spaced relationship on said supporting member and extending at right angles thereto, and a concentric housing engaging the peripheral edges of said projections for enclosing the same, said housing having an inlet port at the hotter end of said heat exchanger where the gas mixture is admitted and an outlet port at the colder end thereof where the gas mixture is discharged, said thermal sink being adjacent to the outlet port adjacent to the colder end of the housing, said thermal sink forming a cold source for said housing, the apertures in successive plates being arranged in staggered relationship to each other, comprising the steps of introucing air into the inlet port of said heat exchanger at a pressure and the area of each aperture being such that the rate of flow speed is at least 0.1 gram of air per second calculated on the basis of volume of the gases entering said inlet port and is transferred through each aperture of said plates at a mean velocity of at least 5 cm. per second, said projections being cooled such that each successive plate is at a maximum temperature of 10° to 20° C. less than the next preceding plate in a direction toward the outlet port, and the plate at which said separation is effected is at a temperature of between —10° to —20° C., thereby substantially preventing the formation of the ice grains in the medium and causing the water and carbon dioxide to settle on said projections.

References Cited in the file of this patent

UNITED STATES PATENTS

| | | |
|---|---|---|
| 1,842,263 | Gobert | Jan. 19, 1932 |
| 2,097,434 | DeBaufre | Nov. 2, 1937 |
| 2,355,660 | Le Rouge | Aug. 15, 1944 |
| 2,460,859 | Trumpler | Feb. 8, 1949 |

FOREIGN PATENTS

| | | |
|---|---|---|
| 899,140 | France | May 22, 1945 |